United States Patent
Kato

(10) Patent No.: US 9,612,783 B2
(45) Date of Patent: Apr. 4, 2017

(54) INFORMATION PROCESSING APPARATUS AND METHOD OF SEARCHING FOR PERIPHERAL DEVICE

(71) Applicant: CANON KABUSHIKI KAISHA, Tokyo (JP)

(72) Inventor: Hisashi Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/625,444

(22) Filed: Feb. 18, 2015

(65) Prior Publication Data

US 2015/0261483 A1    Sep. 17, 2015

(30) Foreign Application Priority Data

Mar. 13, 2014 (JP) ................. 2014-050536

(51) Int. Cl.
 *G06F 3/12* (2006.01)
 *H04W 4/00* (2009.01)
 *H04B 5/00* (2006.01)

(52) U.S. Cl.
 CPC .......... *G06F 3/1236* (2013.01); *G06F 3/1204* (2013.01); *G06F 3/1211* (2013.01); *G06F 3/1292* (2013.01); *H04B 5/0031* (2013.01); *H04W 4/008* (2013.01)

(58) Field of Classification Search
 CPC .... G06F 3/1236; G06F 3/1292; G06F 3/1211; H04B 5/0025
 USPC ................................ 358/1.13, 1.15
 See application file for complete search history.

(56) References Cited

U.S. PATENT DOCUMENTS

| 7,325,235 B2 | 1/2008 | Iida et al. |
| 7,903,272 B2 | 3/2011 | Kato |
| 8,300,238 B2 | 10/2012 | Kato |
| 2011/0006612 A1 | 1/2011 | Kozakai |
| 2014/0355047 A1* | 12/2014 | Lee ...................... G06F 3/1292 358/1.15 |
| 2015/0029526 A1* | 1/2015 | Oshiumi ............... G06F 3/1204 358/1.13 |

FOREIGN PATENT DOCUMENTS

| JP | 2011-19291 A | 1/2011 |
| JP | 2012-56117 A | 3/2012 |
| JP | 2012056117 A | * 3/2012 |

* cited by examiner

*Primary Examiner* — Kent Yip
(74) *Attorney, Agent, or Firm* — Fitzpatrick, Cella, Harper & Scinto

(57) ABSTRACT

Information on a peripheral device in short distance wireless communication is obtained, it is determined whether the information contains an address of the peripheral device, and peripheral devices on a network is searched for if it is determined that the information does not contain the address of the peripheral device.

15 Claims, 13 Drawing Sheets

F I G. 4
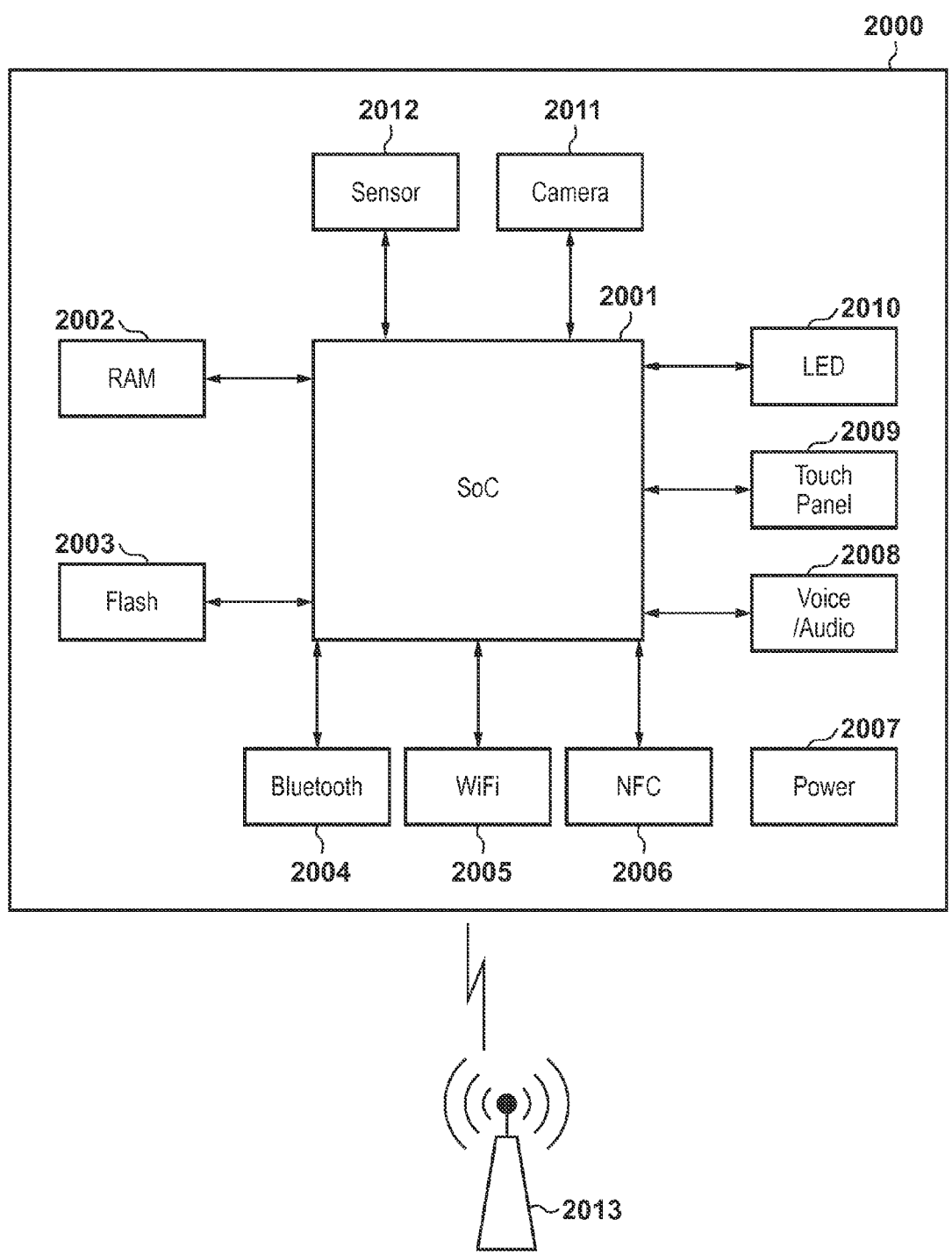

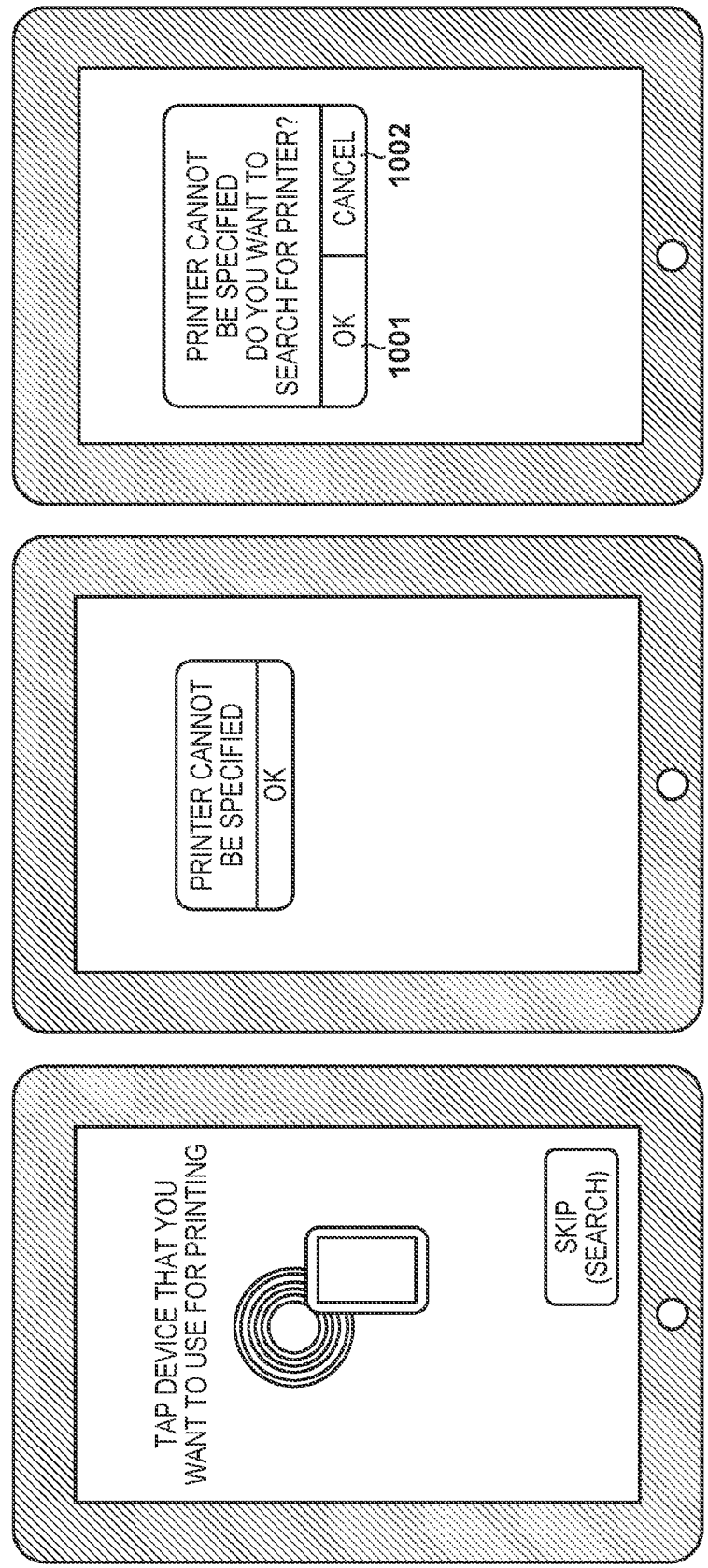

FIG. 12

| NFC SERIAL NUMBER | IP ADDRESS | DEVICE NAME |
|---|---|---|
| XYZ987654321 | 192. 168. 10. 100 | Printer01 |
| ABC12345678 | 192. 168. 10. 102 | Printer02 |

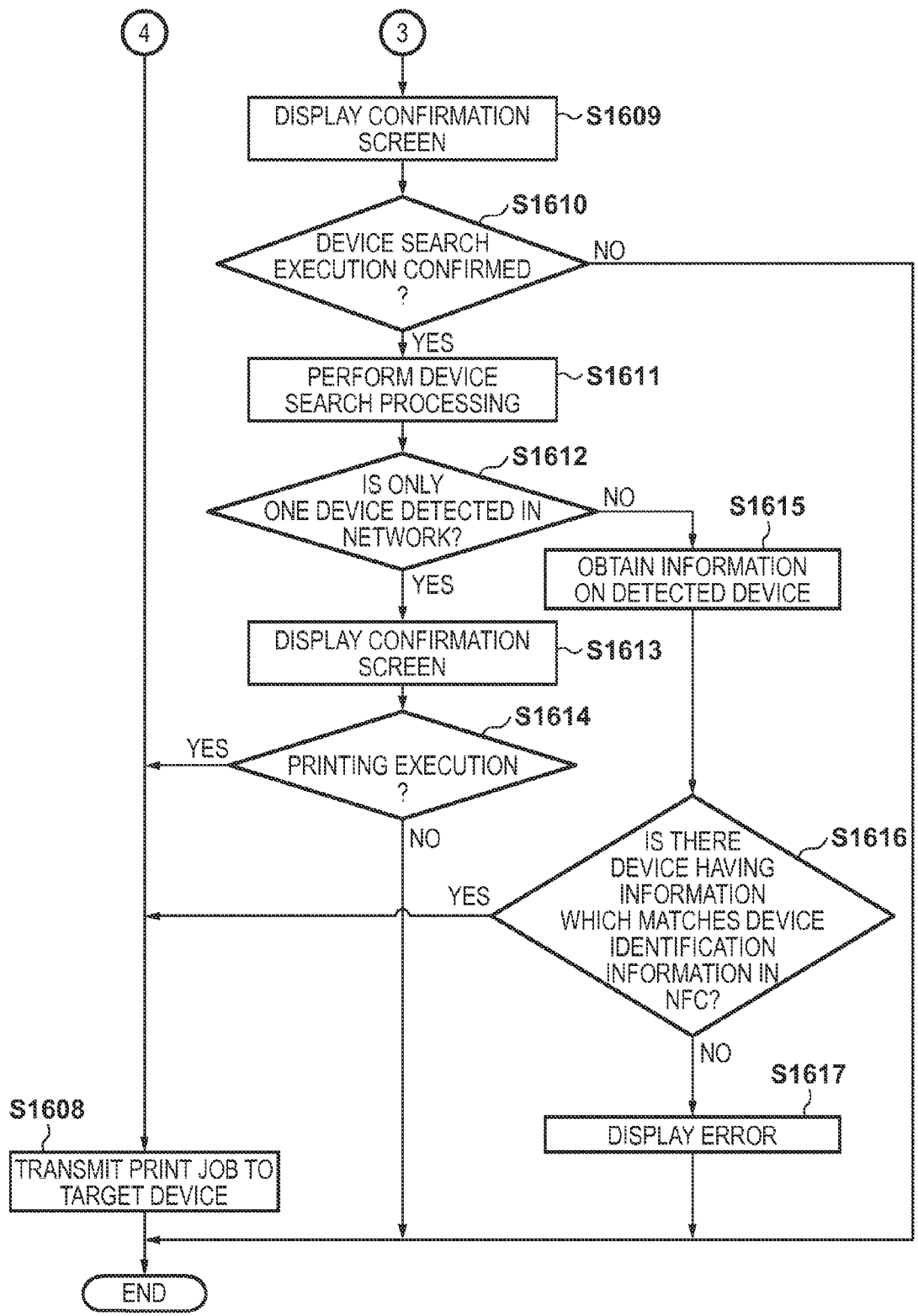

INFORMATION PROCESSING APPARATUS AND METHOD OF SEARCHING FOR PERIPHERAL DEVICE

BACKGROUND OF THE INVENTION

Field of the Invention

The present invention relates to an information processing apparatus and a method of searching for a peripheral device.

Description of the Related Art

Japanese Patent Laid-Open No. 2012-56117 discloses a method of detecting another printer by short distance wireless communication if a print job in a print disable state is detected.

In this specification, a peripheral device on a network is specified using short distance wireless communication such as NFC (Near Field Communication). Also in this specification, an arrangement is assumed in which, in order to specify the peripheral device on the network, an information processing apparatus obtains information containing the address such as the IP address of the peripheral device in short distance wireless communication and communicates with the peripheral device using the obtained address. However, the following problem arises in this arrangement.

That is, the IP address of the peripheral device is not necessarily fixed because it may be allocated by a DHCP server or the like, and thus an IP address obtained using short distance wireless communication and an IP address actually allocated to the peripheral device may not match. Even if an IP address is allocated statically, an administrator of the peripheral device may change the IP address manually. Furthermore, an address may fail to be obtained even by using short distance wireless communication in the first place. Assume a case in which an NFC seal tag is used as an example. If an initial setting for the NFC seal tag has not been completed, an IP address is not saved in the tag, and thus the IP address of a printer cannot be obtained even if tapping a mobile terminal. On the other hand, Japanese Patent Laid-Open No. 2012-56117 does not consider that a printer to which the NFC seal tag is attached is specified in such print disable case.

SUMMARY OF THE INVENTION

The present invention performs processing for specifying a peripheral device even if information obtained using short distance wireless communication does not contain an address actually allocated to the peripheral device.

An information processing apparatus according to an aspect of the present invention comprises: an obtaining unit that obtains information on a peripheral device by short distance wireless communication; a determination unit that determines whether the information contains an address of the peripheral device; and a search unit that searches for peripheral devices on a network if the determination unit determines that the information does not contain the address of the peripheral device.

The present invention can perform the processing for specifying the peripheral device even if the information obtained using short distance wireless communication does not contain the address actually allocated to the peripheral device.

Further features of the present invention will become apparent from the following description of exemplary embodiments with reference to the attached drawings.

BRIEF DESCRIPTION OF THE DRAWINGS

FIG. 4 is a diagram showing the hardware arrangement in which the printing system operates;

FIG. 8 is a view showing a UI2 upon pressing the print button;

FIG. 9 is a view showing an example of a UI on an error screen;

FIG. 10 is a view showing the UI upon confirming device search execution;

FIG. 12 is an NFC information management table;

FIGS. 16A and 16B are flowcharts showing an operation upon pressing a print button in the third example.

DESCRIPTION OF THE EMBODIMENTS

<System Arrangement>

An example of embodiments of the present invention will be described in detail below with reference to the attached drawings. First, items common to the respective embodiments will be described.

First, an NFC seal tag which will be mentioned on several occasions in this specification will be described. Printing using NFC can be implemented by attaching a seal type tag (to be referred to as the NFC seal tag hereinafter) called a passive tag to a device without an NFC reader/writer. When using the NFC seal tag, necessary information such as the IP address and the name of the device is written in the tag in advance by a writing device. A mobile terminal having a function of reading NFC information reads the information written in the NFC seal tag, making it possible to obtain the destination information of the device and transmit a print job. Note that the device is an example of the peripheral device and the mobile terminal is an example of an information processing apparatus.

Figure 1A:
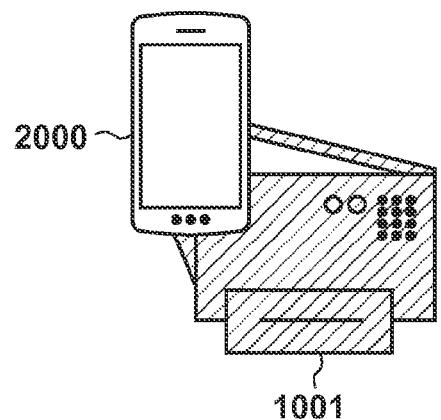
FIGS. 1A and 1B are views showing methods of selecting a device and printing to the device using NFC.
Figure 1B:
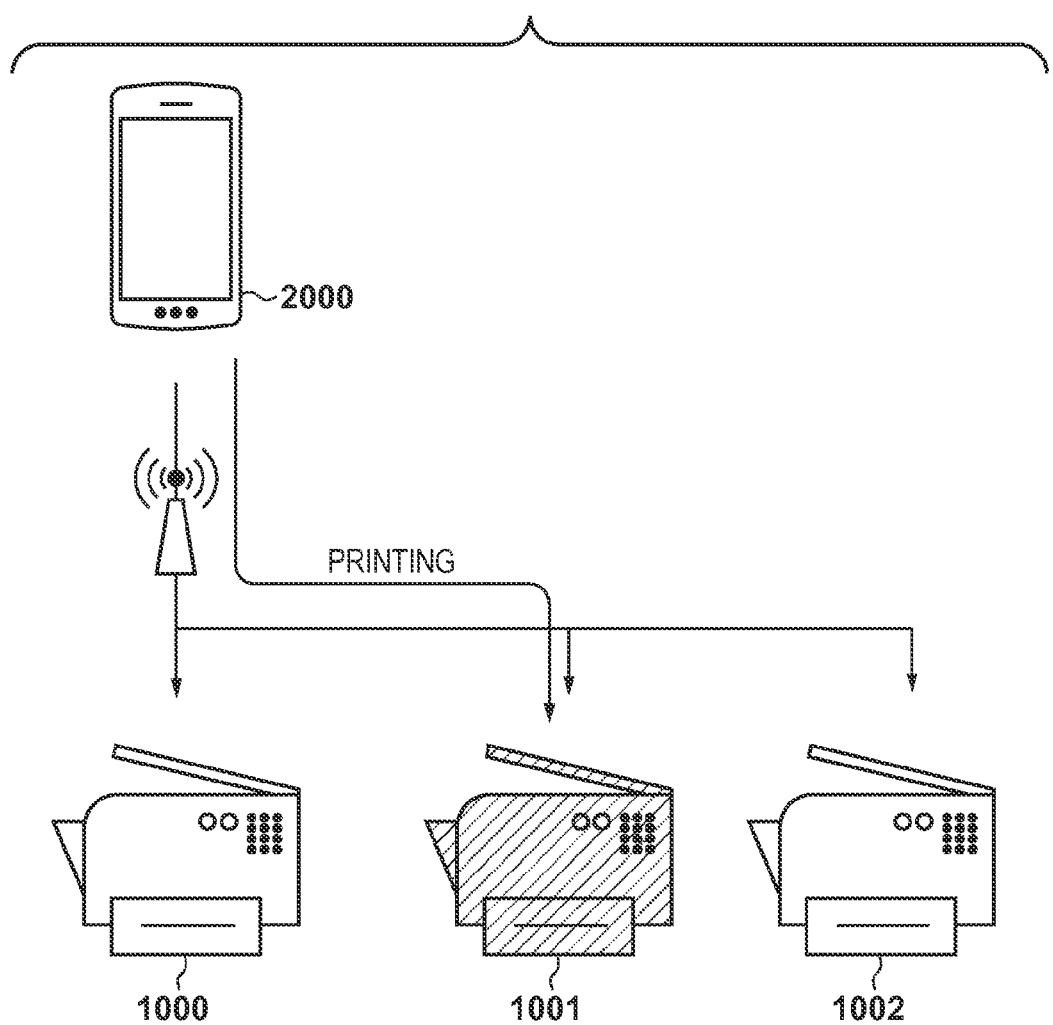

FIGS. 1A and 1B are views showing an operation method when an NFC mobile terminal performs printing using a device to which the NFC seal tag is attached. As shown in FIG. 1A, when a mobile terminal 2000 is brought close to a device 1001, an NFC reader mounted on the mobile terminal 2000 reads destination information (address information) or the like saved in the NFC (the NFC seal tag, in particular) of the device 1001. Then, the mobile terminal 2000 transmits a print job to an address read via a network, as shown in FIG. 1B. If the print job is transmitted to an initial address in this way, the printing succeeds. Note that the device is a network device such as a multifunction peripheral (MFP) having a print function. This embodiment can also be applied to a case in which the purpose of data transmission is not printing but just data transmission or another.

Figure 2:
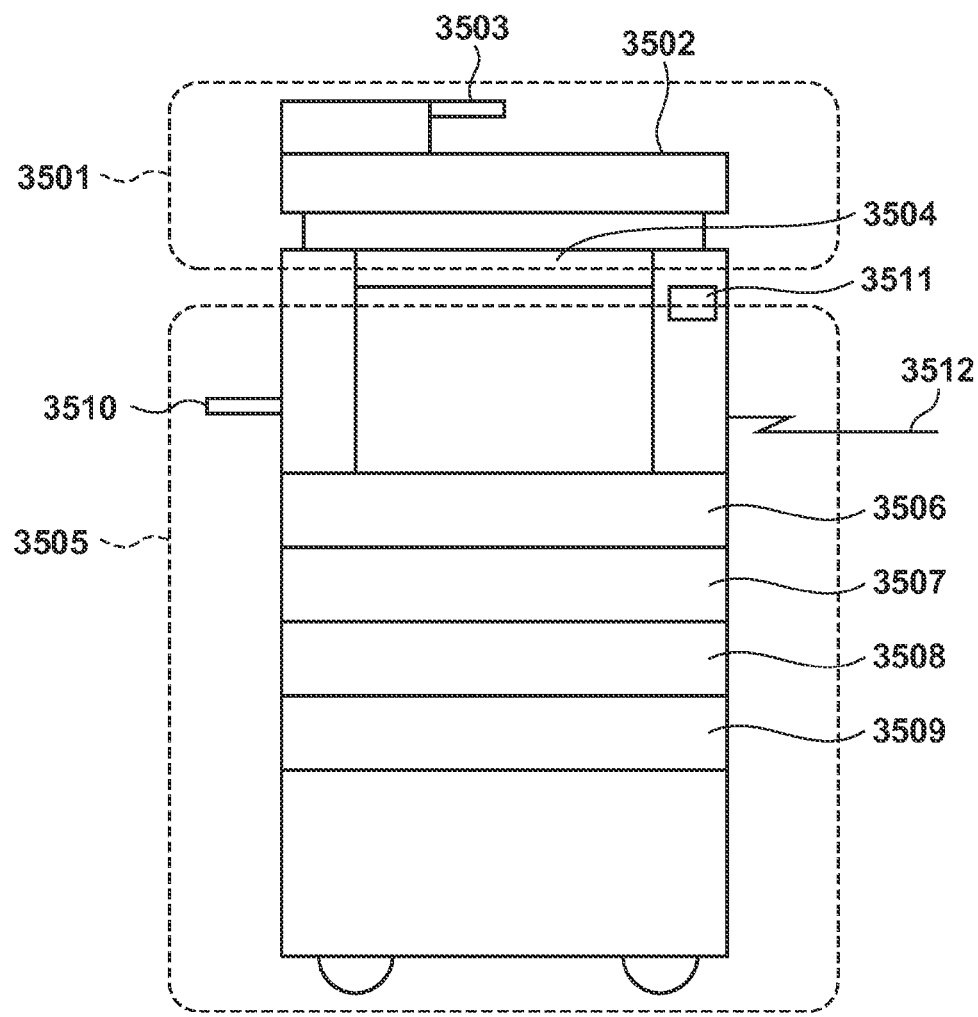
FIG. 2 is a view showing a hardware arrangement in which a printing system operates.

FIG. 2 is a view showing the outer appearance of the device (also referred to as the network device or the peripheral device) 1001 serving as an image forming apparatus. A scanner unit 3501 serving as an image input apparatus illuminates an image drawn on an original and scans a CCD line sensor (not shown), thereby reading the image and converting it as raster image data into an electrical signal. Original paper sheets are set on a tray 3503 of an original feeder 3502. A user inputs a reading activation instruction at an operation unit 3504. Then, a controller CPU gives the scanner unit 3501 an instruction, and the original feeder 3502 feeds the original paper sheets one by one and performs an original image reading operation.

A printer unit 3505 serving as an image output apparatus is a unit which converts electrical raster image data into a visible image on a paper sheet. The conversion method includes an electrophotographic method using a photosensitive drum, a photosensitive belt, and the like, and an inkjet method of discharging ink from a micronozzle array and directly printing an image on a paper sheet. However, any method can be used. The activation of a print operation starts by an instruction from the controller CPU. The printer unit 3505 includes a plurality of paper feed units so that the user can select different paper sizes or paper orientations, and also includes paper cassettes 3506, 3507, 3508, and 3509 corresponding to them. A discharge tray 3510 receives a paper after printing. An NFC seal tag 3511 is attached to the device 1001. The device 1001 does not include an NFC reader/writer. Communication with the device 1001 can be possible by holding the mobile terminal over the NFC seal tag 3511. A communication unit 3512 performs network communication such as WiFi® or Ethernet®.

Figure 3:
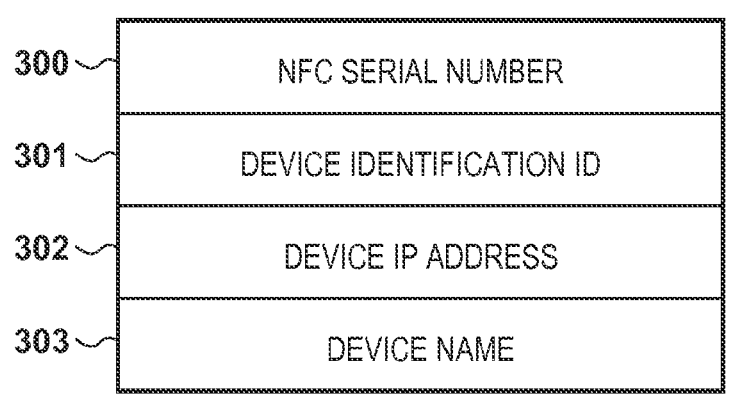
FIG. 3 is a view showing an example of data in an NFC seal tag.

FIG. 3 shows an example of data saved in the NFC seal tag 3511. The NFC seal tag 3511 stores an NFC serial number 300, a device ID 301, a device IP address 302, and a device name 303. The NFC serial number 300 is unrewritable unique data allocated to the NFC seal tag. The device ID 301 is the identifier of the device 1001, such as a MAC address. The device IP address 302 is the destination information of the device 1001. The device name 303 is the name of the device 1001.

This specification is assumed to use NFC as short distance wireless communication. However, the present invention is not limited to this. A technique such as Felica®, MIFARE®, RFID (Radio Frequency IDentification), or Trancefer Jet can be employed instead.

Furthermore, in this example, since the device 1001 does not have an ability to write in the NFC, the information on the NFC seal tag 3511 attached to the device and that on the device 1001 do not synchronize with each other. Therefore, the application of the mobile terminal or the like having the ability to write in the NFC writes the data in the NFC seal tag 3511 in advance. Unless this writing is performed, regions other than the region of the NFC serial number 300 in the NFC seal tag 3511 are left blank. Further, an administrator or the like manually attaches the NFC seal tag.

FIG. 4 is a diagram showing the arrangement of the mobile terminal 2000 where a printing system 100 operates. A flash memory (Flash) 2003 stores the program of the printing system 100. The entity of execution on hardware is an SoC (System on a chip) 2001 including a processor (CPU), whereas the entity of control on software is the printing system 100 stored in the flash memory (Flash) 2003. NFC 2006 performs short distance communication, and more specifically, communicates with the NFC seal tag 3511 of the device 1001 shown in FIG. 2 and writes/reads information. WiFi 2005 is a WiFi unit which performs wireless communication, and more specifically, performs wireless communication with the device 1001 connected to the network via a WiFi access point 2013. A RAM (Random Access Memory) 2002 stores data and a program. Bluetooth® 2004 performs short distance communication. A power unit 2007 is the power supply of this mobile terminal. A Voice/Audio unit 2008 is a voice/audio input/output unit such as a microphone or a speaker. A touch panel 2009 provides a user interface that allows the user to perform an operation using his/her fingers on a display unit. An LED (Light Emitting Diode) 2010 is a light-emitting element for back light, an indicator, illumination, or the like. A camera unit 2011 is configured to capture, for example, a still image or video. A sensor unit 2012 includes various sensors such as a GPS (Global Positioning System) sensor, an acceleration sensor, a geomagnetic field sensor, and a proximity sensor. This example is assumed to use, for example, Android® from Google as an operating system (OS). However, the present invention is not limited to this.

<Printing System>

Figure 5:
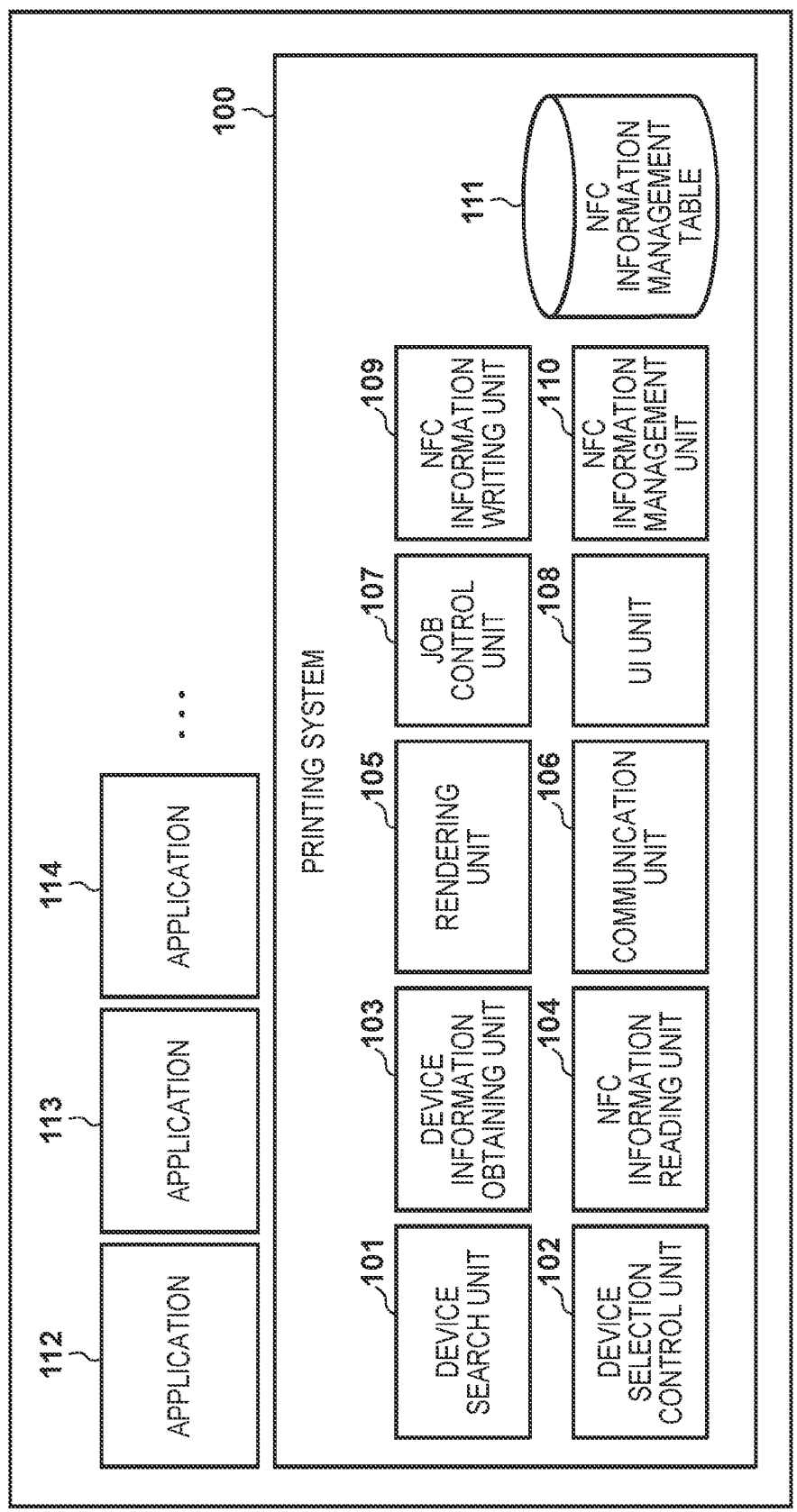
FIG. 5 is a block diagram showing the arrangement of a printing system 100.

FIG. 5 is a block diagram showing the arrangement of a printing system 100 mounted on a mobile terminal 2000, and more particularly, the software arrangement. The printing system 100 includes a device search unit 101, a device selection control unit 102, a device information obtaining unit 103, an NFC information reading unit 104, a rendering unit 105, a communication unit 106, a job control unit 107, a UI (User Interface) unit 108, an NFC information writing unit 109, and an NFC information management table 111. Applications 112, 113, and 114 use the printing system 100. Note that the word "search" used in this embodiment is sometimes rephrased into the word "retrieve". In this case, the device search unit 101 is referred to as the device retrieve unit 101.

The device search unit 101 searches for a device using multicast communications. A protocol uses an SLP or a Multicast-DNS but is not limited to this. Furthermore, the device search unit 101 may use a broadcast communication instead of the multicast communications. The NFC information reading unit 104 reads, using short distance wireless communication (for example, NFC), the information on an NFC seal tag attached to the device. This example is assumed to use NFC as short distance wireless communication. However, the present invention is not limited to this. The device information obtaining unit 103 obtains device information on the model name, the location, and the like from the device. The device selection control unit 102 performs control for determining a device to which a print job is transmitted, based on the information obtained by the NFC information reading unit 104, or the device information obtained by the device search unit 101 or the device information obtaining unit 103. The rendering unit 105 renders a document generated or displayed in each of the applications 112 to 114 into a PDL (Page Description Language) or an image printable by the device 1001. The communication unit 106 performs network communication with the device using WiFi. The job control unit 107 performs job control of, for example, queuing print jobs. The UI unit 108 is a user interface. The NFC information writing unit 109 writes the information in the NFC seal tag attached to the device using short distance wireless communication (for example, NFC). An example of a printing operation performed by holding the mobile terminal over the seal tag attached to the device 1001 will be described below.

[First Example]

Figure 7:
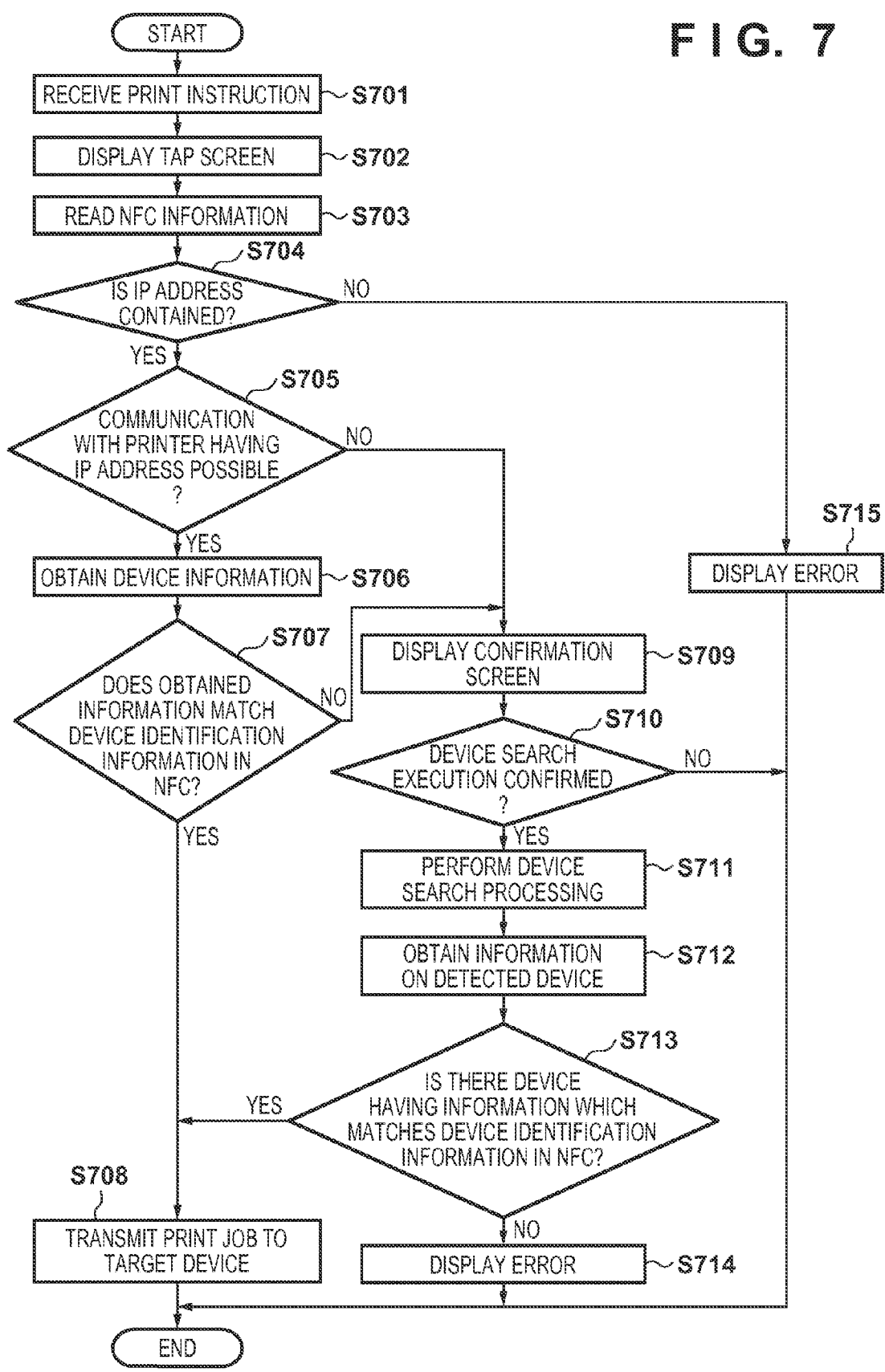
FIG. 7 is a flowchart showing an operation upon pressing the print button in the first example.

FIG. 7 is a flowchart showing an example of the operation of a printing system 100 after pressing the print button of an application which displays a document or an image. A process to be described in this example is implemented by loading a program recorded in a Flash 2003 to a RAM 2002 and executing it by an SoC 2001. Note that in the explanation of FIG. 7, each component in the arrangement of the printing system in FIG. 5 will sometimes be described as the entity of each step. However, the entity of hardware is the SoC 2001 or a CPU built into the SoC 2001.

Figure 6:
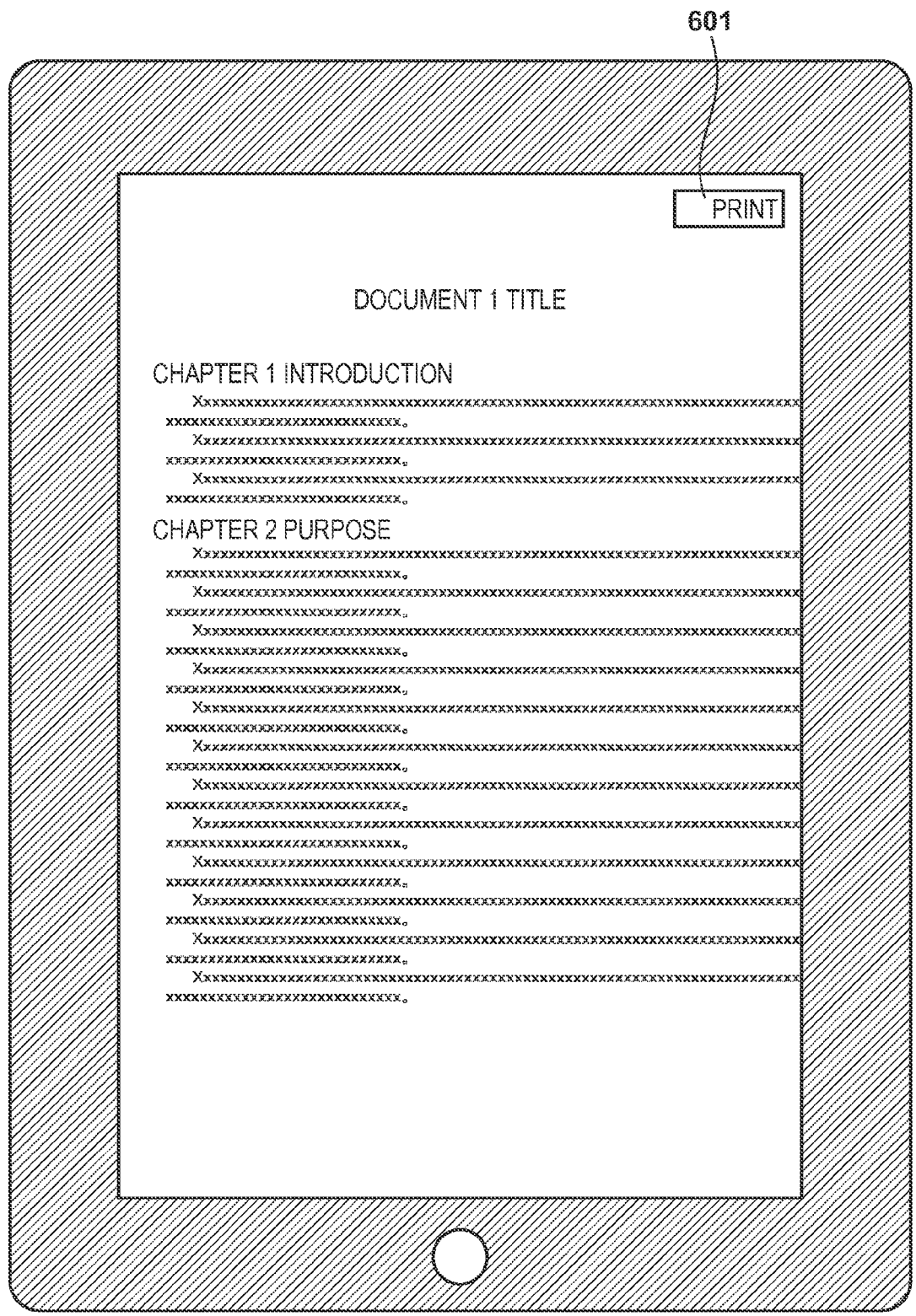
FIG. 6 is a view showing a UI1 upon pressing a print button.

In step S701, the SoC 2001 accepts pressing of a print button 601 of the application which displays the document or the image (FIG. 6). FIG. 7 shows pressing of the print button as if it were a part of the process. However, this is for the descriptive convenience, and the process may be started using pressing of the print button 601 as a trigger. In response to pressing of the print button 601, a UI unit 108 displays, in step S702, a screen (FIG. 8) for prompting to tap the device in short distance communication (for example, NFC). Here, it is assumed to use NFC as short distance communication. However, the present invention is not limited to this. If an operator taps a mobile terminal 2000 on a device 1001 as shown in FIG. 1A in response to the message, an NFC information reading unit 104 obtains information on the device such as an NFC serial number 300, a device ID 301, a device IP address 302, and a device name 303 recorded in an NFC seal tag 3511 as shown in FIG. 3 (step S703). In steps S704 and S705, a device selection control unit 102 determines whether the obtained information on the device contains the device address. In step S704, the device selection control unit 102 determines whether data is stored in the region of the device IP address 302 out of the information obtained in step S703. Note that in step S704, an error occurs if no IP address is contained. However, an arrangement may be employed in which the process advances to step S709 or S711 to execute device search. If the data is stored in the region of the device IP address 302, the device selection control unit 102 determines in step S705 whether communication is possible with the obtained IP address. The device selection control unit 102 tries to communicate with the IP address via a communication unit 106, and determines that the communication is impossible if there is no response for a predetermined time. The device selection control unit 102 also determines that the obtained information on the device does not contain the device address if the communication is impossible. If the data is not stored in the region of the device IP address 302, the process advances to step S715 in which the UI unit 108 displays an error screen (FIG. 9). Note that a determination of whether the data is stored in each field of the NFC seal tag can be implemented by, for example, before writing in the NFC seal tag, initializing all bits with 0 or 1, or providing a flag or the like indicating that data write has been performed for each field. This is also applied to another medium.

If the device selection control unit 102 determines in step S705 that the communication is possible, a device information obtaining unit 103 communicates with the device 1001 via the communication unit 106 to obtain the information on the device 1001 in step S706. Here, the device information obtaining unit 103 obtains a MAC address as the information on the device 1001. However, other information may be obtained as long as it identifies the device. On the other hand, if the device selection control unit 102 determines in step S705 that the communication is impossible, the process advances to step S709.

In step S707, the device selection control unit 102 determines whether the MAC address obtained from the device in step S706 and a MAC address obtained from the NFC seal tag in step S703 match. If the device selection control unit 102 determines that they match, a job control unit 107 transmits, in step S708, print data generated by a rendering unit 105 to the device 1001 via the communication unit 106, and then the process ends. On the other hand, if the device selection control unit 102 determines that they do not match, the process advances to step S709.

In step S709, the UI unit 108 displays a device search execution confirmation screen (FIG. 10). If a OK button 1001 is pressed in FIG. 10, the UI unit 108 determines in step S710 that device search execution is confirmed and the process advances to step S711. On the other hand, if a cancel button 1002 is pressed, the process ends without performing anything. Note that an arrangement may be employed in which device search is always performed without providing step S709 in which the UI unit 108 displays the confirmation screen.

In step S711, a device search unit 101 searches for a device on the same network as the mobile terminal 2000. In step S712, the device information obtaining unit 103 obtains a MAC address serving as the device identification information on each device detected in step S711. The device selection control unit 102 determines whether there is a device having a MAC address which matches one of the MAC addresses obtained in step S712 and is obtained from the NFC seal tag in step S703 (step S713). If there is the device having the MAC address which matches one of the MAC addresses obtained in step S712, the process advances to step S708 in which the job control unit 107 transmits the print data to the device having the MAC address which matches one of the MAC addresses obtained in step S712 via the communication unit 106, and then the process ends. On the other hand, if there is no device, in step S713, having the MAC address which matches one of the MAC addresses obtained in step S712, the process advances to step S714 in which the UI unit 108 displays the error and then the process ends (FIG. 9). Device search can be implemented by, for example, sequentially issuing an ARP or a neighbor discovery message to an IP address made of the combination of a network address to which the mobile terminal belongs and all host addresses except for the host address of the mobile terminal itself, and saving the IP address and the responded MAC address in a pair.

As described above, the mobile terminal first confirms that an address obtained from a medium which is attached to a device such as a printer and records the address of the device matches the address of the device, and then uses that address. This makes it possible to use a desirable device even if the address obtained from the medium is a dynamic address due to a mistake or adoption of a DHCP. Furthermore, if the mobile terminal cannot communicate with the address obtained from the medium or if that address do not match the address of the device to which the medium is attached, the mobile terminal tries to obtain the address of that device. If the mobile terminal can obtain the address, it uses the obtained address. This makes it possible to prevent misuse of a device which is not a target device to be used and to further increase the usage rate of the device.

[Second Example]

Figure 11A:
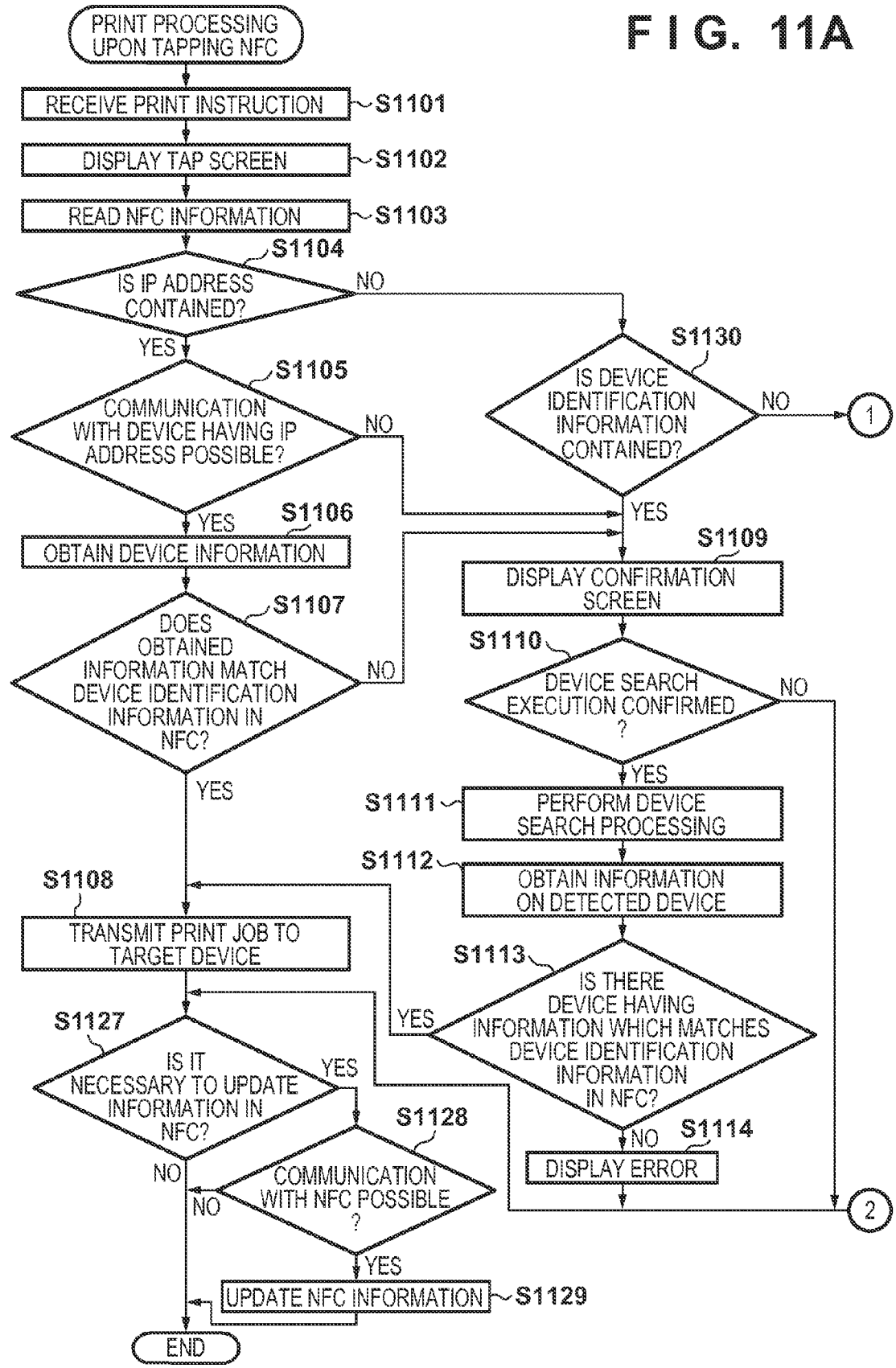
FIGS. 11A and 11B are flowcharts showing an operation upon pressing a print button in the second example.
Figure 11B:
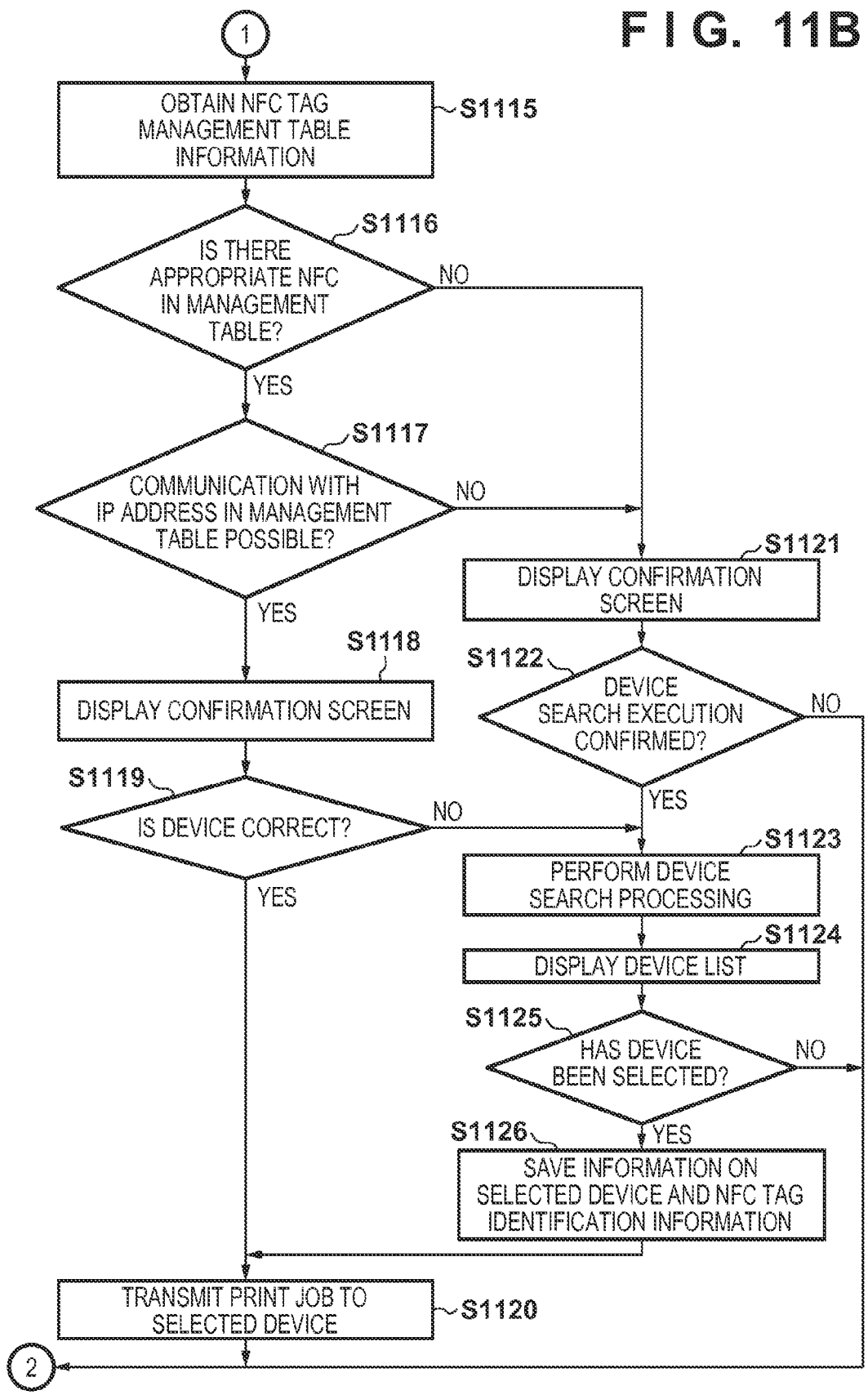

The arrangement of a system and respective apparatuses according to this example is almost the same as in the first example. FIGS. 11A and 11B, instead of FIG. 7, shows a processing procedure performed by the printing system of a mobile terminal 2000.

FIGS. 11A and 11B show a flowchart of an example of the operation of a printing system 100 after pressing the print button of an application which displays a document or an image. A process to be described in this example is implemented by loading a program recorded in a Flash 2003 to a RAM 2002 and executing it by an SoC 2001.

In step S1101, a print button 601 of the application which displays the document or the image is pressed (FIG. 7). As in FIG. 7, the procedure in FIGS. 11A and 11B starts using pressing of the print button 601 as a trigger. In step S1102, a UI unit 108 displays a screen (FIG. 8) for prompting to tap a device in short distance communication (for example, NFC). Here, it is assumed to use NFC as short distance communication. However, the present invention is not limited to this. If an operator taps the mobile terminal 2000 on a device 1001 as shown in FIGS. 1A and 1B, an NFC information reading unit 104 obtains information on an NFC seal tag 3511 as shown in FIG. 3 (step S1103). In step S1104, the device selection control unit 102 determines whether data is stored in the region of a device IP address 302 in the information obtained in step S1103. If the data is stored in the region of the device IP address 302, the same processing as in steps S705 to S714 in the first example is performed in steps S1105 to S1114, and then the process advances to step S1127.

On the other hand, if the device selection control unit 102 determines in step S1104 that an NFC seal tag does not store the device IP address 302, the process advances to step S1130 in which the SoC 2001 determines whether the data is stored in the region of a device ID 301 in the information obtained in step S1103. If the data is stored in the region of the device ID 301 (for example, a MAC address), the same processing as in steps S709 to S714 and S708 in the first example is performed in steps S1109 to S1114 and S1108, and then the process advances to step S1127. On the other hand, if the data is not stored in the region of the device ID 301, the process advances to step S1115.

In step S1115, an NFC information management unit 110 obtains an NFC information management table 111 stored in the Flash 2003 of the mobile terminal 2000. FIG. 12 shows an example of the NFC information management table 111. The NFC information management table 111 holds, for each registered device, an NFC serial number 1201, an IP address 1202, and a device name 1203. In the example of FIG. 12, the NFC information management table 111 holds information on a device 1204 having a device name Printer01 and a device 1205 having a device name Printer02. The NFC information management table 111 associates the devices, their addresses, and the NFC seal tags with each other. The NFC information management table 111 is created in step S1126 to be described later.

In step S1116, the device selection control unit 102 determines whether there exists, in the NFC information management table 111, a given NFC serial number which matches the NFC serial number obtained from the NFC serial tag in step S1103. If there is given device information which matches the NFC serial number obtained in step S1103, the device selection control unit 102 determines, in step S1117, whether communication is possible with the IP address 1202 of a device corresponding to the given NFC serial number in the NFC information management table 111. The device selection control unit 102 tries to communicate with an IP address corresponding to the given NFC serial number in the NFC information management table 111 obtained in step S1115. If there is no response for a predetermined time, the device selection control unit 102 determines that the communication is impossible.

Figure 13:
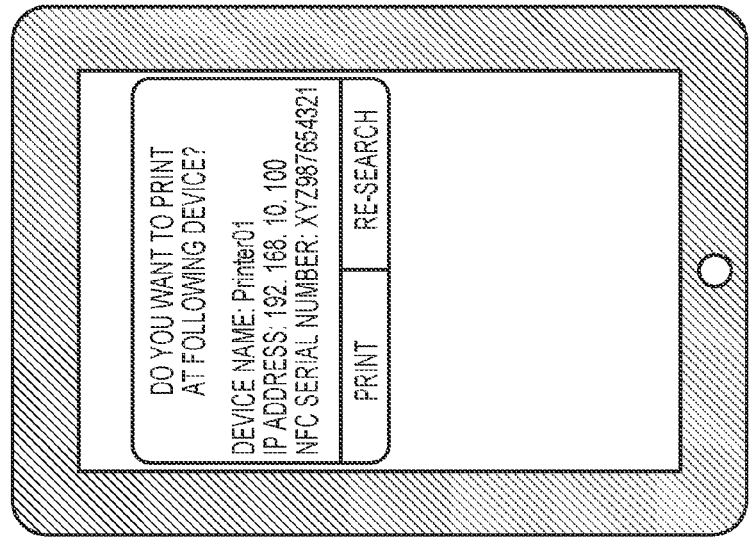
FIG. 13 is a view showing a device confirmation screen.

On the other hand, if the communication is possible with the IP address in the NFC information management table 111, the UI unit 108 displays, in step S1118, a confirmation screen together with the given information on the device (FIG. 13). The UI unit 108 displays, for example, given items in the NFC information management table 111 such as a device name, an IP address, and an NFC serial number. The confirmation screen also includes a print button which gives an instruction to print and a re-search button which gives an instruction to search for another device.

In step S1119, the SoC 2001 determines whether the print button is pressed on the confirmation screen in FIG. 13. If the print button is pressed, a job control unit 107 transmits, via a communication unit 106, print data to a device displayed on the confirmation screen in FIG. 13, and the process advances to step S1127 (step S1120). On the other hand, if the re-search button is pressed, the process advances to step S1123.

If the device selection control unit 102 determines, in step S1116, that the device information which matches the NFC serial number obtained in step S1103 does not exist in the NFC information management table 111 or determines, in step S1117, that the communication is impossible, the UI unit 108 displays a confirmation screen in FIG. 10 (step S1121). If an OK button 1001 is pressed on the confirmation screen in FIG. 10, the device selection control unit 102 determines in step S1122 that device search execution is confirmed, and a device search unit 101 searches for a device on the same network (step S1123). On the other hand, if a cancel button 1002 is pressed, the device selection control unit 102 determines in step S1122 that device search execution is not confirmed, and the process advances to step S1127 without performing anything.

Figure 14:
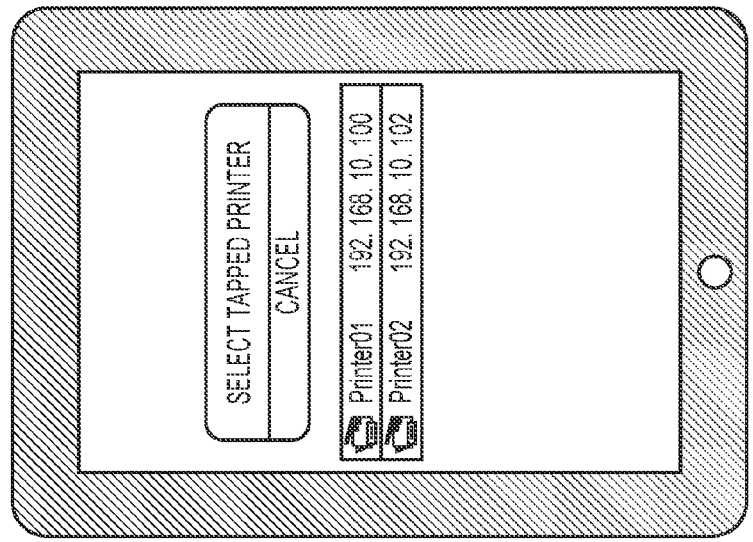
FIG. 14 is a view showing a device selection screen.

When device search processing in step S1123 ends, the UI unit 108 displays a search result list in step S1124 (FIG. 14). The list includes the device names and their IP addresses. However, the list may display device names or IP addresses. In step S1125, the device selection control unit 102 determines whether the device is selected from a device list in FIG. 14. If the device is selected, the NFC information management unit 110 saves, in the NFC information management table 111, information on the device (the device name and the IP address) selected in FIG. 14 and the NFC serial number obtained in step S1103 in association with each other (step S1126). In step S1126, if the same NFC serial number has already been saved, the UI unit 108 displays a confirmation screen of overwrite (not shown), and then the NFC information management unit 110 saves the NFC serial number by overwrite if instructed to do so. The NFC information management unit 110 does not save the NFC serial number by overwrite if not instructed to do so. Next, in step S1120, the job control unit 107 transmits the print data to the device selected via the communication unit 106, and then the process advances to step S1127. On the other hand, if the device selection control unit 102 determines in step S1125 that the cancel button is pressed in FIG. 14, the process advances to step S1127 without performing anything.

In step S1127, the device selection control unit 102 determines whether it is necessary to update the information in the NFC seal tag 3511. The device selection control unit 102 determines that the information update is necessary if the job control unit 107 transmits, in steps S1108 and S1120, the print job to a destination address which is different from the device IP address 302 in the NFC seal tag 3511. If the information update is not necessary, the process ends without performing anything. If the information update is necessary, the SoC 2001 determines, in step S1128, whether an NFC information writing unit 109 can communicate with the NFC seal tag 3511. The SoC 2001 determines that the communication is possible if an NFC having the same serial number as that of the NFC seal tag 3511 exists in NFCs that can communicate by the NFC 2006. If the communication is impossible, the process ends without performing anything. If the communication is possible, the NFC information writing unit 109 writes, in the NFC seal tag 3511, the IP address, the device identification ID, and the device name of the device to which the print job has been transmitted in steps S1108 and S1120 (step S1129), and then the process ends.

According to the above procedure, in addition to an operation effect in the first example, it is possible to communicate with a target device based on the correspondence between a device address and NFC identification information, that is, the NFC serial number held in the mobile terminal itself even if neither the IP address nor the MAC address of the device is obtained from the NFC seal tag attached to the device, thereby causing the device to perform printing. Furthermore, even if the given NFC identification information is not registered in the NFC information management table which associates the NFC identification information and the IP address of the device with each other, communication can be performed with a device selected from found devices as a party at the other end. In this case, it is further possible to newly hold the NFC identification information and the address of the selected device in association with each other, and reuse them at the time of next communication.

From above, it is possible to prevent misuse of a device which is not the target device and to further increase the usage rate of the device. Furthermore, if the NFC seal tag can be written from the mobile terminal 2000, it is possible to rewrite the contents of the NFC seal tag into contents appropriate for a device to which the NFC seal tag is attached, and to implement more efficient communication and thus print processing.

[Third Example]

Figure 16A:
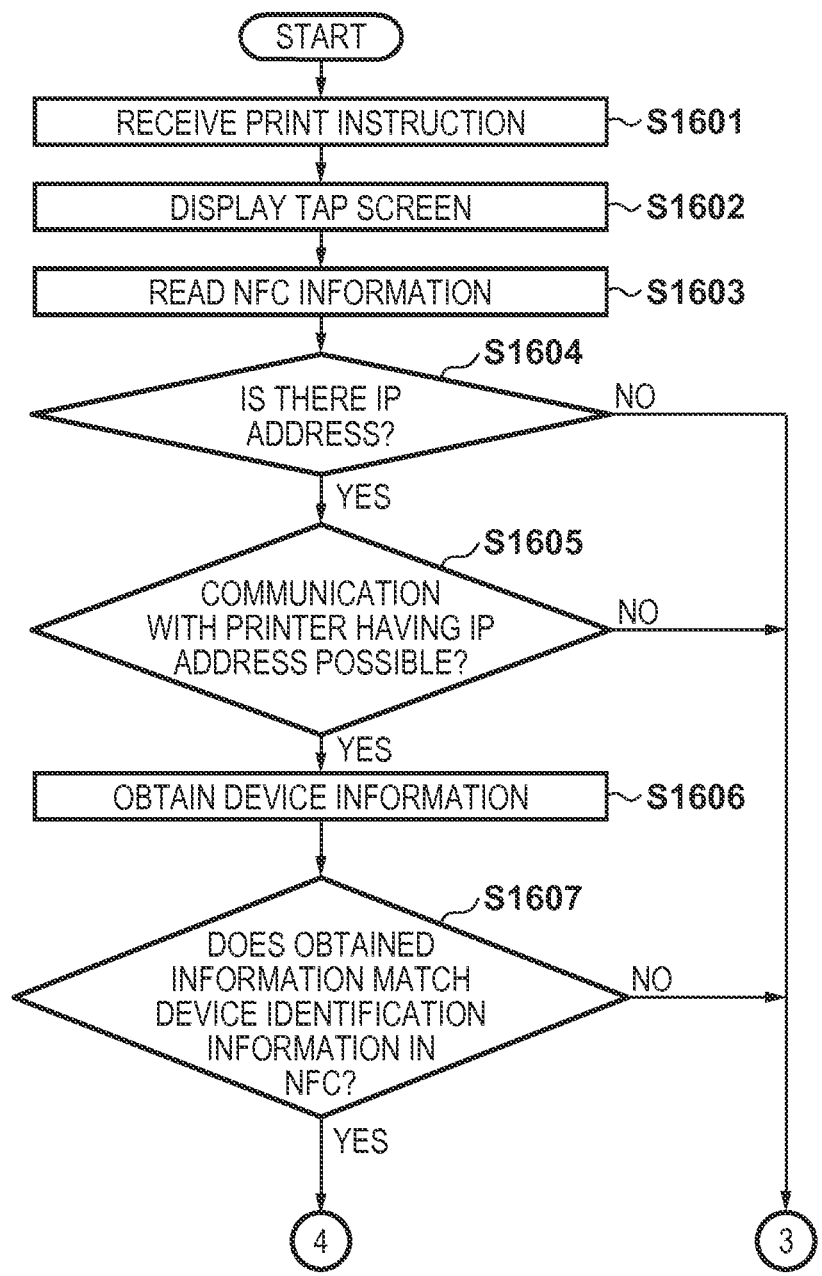

FIGS. 16A and 16B are flowcharts showing an example of the operation of a printing system 100 after pressing the print button of an application which displays a document or an image. A process to be described in this example is implemented by loading a program recorded in a Flash 2003 to a RAM 2002 and executing it by an SoC 2001.

In step S1601, a process in FIGS. 16A and 16B starts using, as a trigger, pressing the print button of the application which displays the document or the image (FIG. 7). In step S1602, a UI unit 108 displays a screen (FIG. 8) for prompting to tap a device in short distance communication (for example, NFC). Here, it is assumed to use NFC as short distance communication. However, the present invention is not limited to this. If an operator taps the mobile terminal 2000 on a device 1001 as shown in FIGS. 1A and 1B, an NFC information reading unit 104 obtains information on an NFC seal tag 3511 as shown in FIG. 3 (step S1603). In step S1604, a device selection control unit 102 determines whether data is stored in the region of a device IP address 302 in the information obtained in step S1603. If the data is stored in the region of the device IP address 302, the device selection control unit 102 determines in step S1605 whether communication is possible with an IP address obtained via a communication unit 106. The device selection control unit 102 tries to communicate with the IP address obtained in step S1603. If there is no response for a predetermined time, the device selection control unit 102 determines that the communication is impossible. If the data is not stored in the region of the device IP address 302, the process advances to step S1609.

If the device selection control unit 102 determines in step S1605 that the communication is possible, a device information obtaining unit 103 obtains the information on a device 1001 via the communication unit 106 in step S1606. Here, the device information obtaining unit 103 obtains, as the information on the device 1001, a MAC address serving as identification information. However, the present invention is not limited to this. On the other hand, if the device selection control unit 102 determines in step S1605 that the communication is impossible, the process advances to step S1609.

In step S1607, the device selection control unit 102 determines whether the MAC address obtained in step S1606 and the MAC address obtained in step S1603 match. If the device selection control unit 102 determines that they match, a job control unit 107 transmits, in step S1608, print data generated by a rendering unit 105 to the device 1001 having the MAC address via the communication unit 106, and then the process ends. On the other hand, if they do not match, the process advances to step S1609.

In step S1609, the UI unit 108 displays a device search execution confirmation screen (FIG. 10). If a OK button 1001 is pressed in FIG. 10, the UI unit 108 determines that device search execution is confirmed and the process advances to step S1611, whereas if a cancel button 1002 is pressed, the process ends without performing anything (step S1610).

Figure 15:
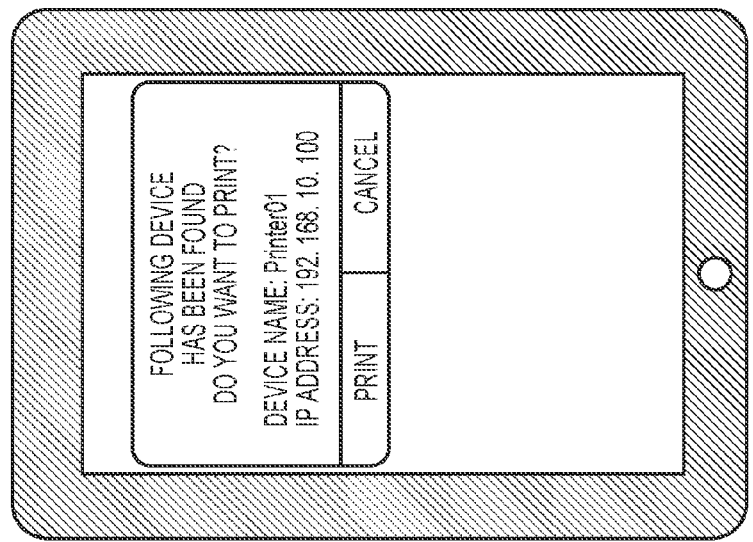
FIG. 15 is a view showing a print confirmation screen.

In step S1611, a device search unit 101 searches for the device on the same network as the mobile terminal 2000. In step S1612, the SoC 2001 determines whether only one device has been detected in the search in step S1611. If only one device has been detected, the UI unit 108 displays a print confirmation screen in FIG. 15 (step S1613). In step S1614, the SoC 2001 determines whether a print button is pressed on the print confirmation screen. If the print button is pressed, the process advances to step S1608 in which the job control unit 107 transmits print data to the device 1001 found in step S1611 via the communication unit 106, and then the process ends. On the other hand, if a cancel button is pressed on the print confirmation screen, the process ends without performing anything.

In step S1612, the SoC 2001 determines that a plurality of or none of devices have been detected in the search in step S1611, the process advances to step S1615. In step S1615, the device information obtaining unit 103 obtains a MAC address serving as device identification information from each device that has been detected in search processing in step S1611. The device selection control unit 102 determines whether the device identification information obtained in step S1615 includes a device having a MAC address which matches the MAC address obtained from a BFC seal tag in step S1603 (step S1616). If the device identification information includes the device having the MAC address which matches the MAC address obtained from the BFC seal tag in step S1603, the process advances to step S1608 in which the job control unit 107 transmits, via the communication unit 106, print data to the device having the MAC address which matches the MAC address obtained from the BFC seal tag in step S1603, and then the process ends. On the other hand, if the device identification information does not include, in step S1616, the device having the MAC address which matches the MAC address obtained from the BFC seal tag in step S1603, the UI unit 108 displays an error in step S1617, and then the process ends (FIG. 9). Note that if no device could be detected in step S1611, the device selection control unit 102 determines in step S1616 that the device identification information does not include the device which matches the MAC address obtained from the BFC seal tag in step S1603.

According to the above process, in this embodiment, if the IP address of the device is not recorded in the NFC seal tag or communication with the device is impossible even if the IP address is recorded, or if the registered IP address does not match the IP address of the device that has been registered in the NFC seal tag, the device is searched in response to an instruction. Then, if only one device is detected, printing or the like will be performed using the detected device according to the result of user confirmation.

Therefore, if only one device without freedom of choice has been detected, a user need not select the device, thus making an operation more simple.

(Other Embodiments)

Each above-described example is assumed to use NFC as short distance wireless communication. However, the present invention is not limited to this. It is possible to use a device instead of an NFC seal tag as long as the device has a certain storage capacity and communication function, and serves as a tag or the like in which contents stored by an attached device main body are not rewritable. This embodiment can also be applied to an arrangement in which the communication function need not be included, but a two-dimensional barcode with, for example, encoded address information is attached to the device and read and decoded by the camera of a mobile terminal, thereby reading contents.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-050536, filed Mar. 13, 2014 which is hereby incorporated by reference herein in its entirety.

What is claimed is:

1. An information processing apparatus comprising:
   one or more processors; and
   a memory storing instructions which, when executed by the processor, cause the information processing apparatus to function as:
   an obtaining unit that obtains information on a peripheral device by short distance wireless communication;
   a first determination unit that determines whether the obtained information contains a network address of the peripheral device;
   a second determination unit that determines whether or not the obtained information contains identification information of the peripheral device in a case where the first determination unit determines that the obtained information does not contain the network address of the peripheral device; and
   a search unit that searches for peripheral devices on a network and identifies, from among the peripheral devices, a peripheral device to which the same identification information as the obtained information contains has been set in a case where the second determination unit determines that the obtained information contains identification information and an instruction to search for a peripheral device is made.

2. The apparatus according to claim 1, wherein the search unit performs searching if a confirmation screen is displayed and receives the instruction to search.

3. The apparatus according to claim 1, wherein the information processing apparatus further functions as a communication unit that communicates with a peripheral device, out of the peripheral devices found by the search unit, to which the same identification information as the obtained information contains has been set.

4. The apparatus according to claim 1, wherein the information processing apparatus further functions as a communication unit that, if the search unit has found one peripheral device, communicates with the peripheral device if a confirmation screen is displayed and receives the instruction to search.

5. The apparatus according to claim 1, wherein the information processing apparatus further functions as a storage unit configured to store a management table which associates identification information contained in the obtained information and the network address of the peripheral device; and
   a communication unit that communicates with a peripheral device of a communicable address associated with the identification information if the management table stores the communicable address,
   wherein if the information obtained by the obtaining unit contains neither the network address nor identification information of the peripheral device, the search unit searches for the peripheral device if the management table does not store the communicable address associated with the identification information.

6. The apparatus according to claim 5, wherein the information processing apparatus further functions as a registration unit that causes the search unit to search for the peripheral device if the management table does not store the communicable address associated with the identification information, and registers a network address of a found peripheral device and the identification information in the management table.

7. The apparatus according to claim 1, wherein the obtaining unit obtains, as the information, at least an identifier of the peripheral device in the short distance wireless communication,
   the information processing apparatus further functions as a third determination unit that determines whether there exists, in the peripheral devices detected as a result of searching by the search unit, the peripheral device having an identifier of each of the detected peripheral devices and the identifier obtained by the obtaining unit matching with each other, and a transmission unit that transmits a print job to the peripheral device determined by the third determination unit that the identifiers match.

8. A method of searching for a peripheral device by an information processing apparatus, comprising:

obtaining information on the peripheral device in short distance wireless communication;

first determining whether the obtained information contains a network address of the peripheral device;

second determining whether or not the obtained information contains identification information of the peripheral device in a case where the first determining determines that the obtained information does not contain the network address of the peripheral device; and searching for peripheral devices on a network and identifying, from among the peripheral devices, a peripheral device to which the same identification information as the obtained information contains has been set in a case where the second determining determines that the obtained information contains identification information and an instruction to search for a peripheral device is made.

9. The method according to claim 8, wherein the searching performs searching if a confirmation screen is displayed and receives the instruction to search.

10. The method according to claim 8, further comprising communicating with a peripheral device, out of the peripheral devices found by the searching, to which the same identification information as the obtained information contains has been set.

11. The method according to claim 8, further comprising, if the searching has found one peripheral device, communicating with the peripheral device if a confirmation screen is displayed and receives the instruction to search.

12. The method according to claim 8, further comprising storing a management table which associates identification information contained in the obtained information and the network address of the peripheral device; and communicating with a peripheral device of a communicable address associated with the identification information if the management table stores the communicable address, wherein if the information obtained by the obtaining contains neither network address nor identification information of the peripheral device, the searching searches for the peripheral device if the management table does not store the communicable address associated with the identification information.

13. The method according to claim 12, further comprising causing the searching to search for the peripheral device if the management table does not store the communicable address associated with the identification information, and registering a network address of a found peripheral device and the identification information in the management table.

14. The method according to claim 8, wherein the obtaining obtains, as the information, at least an identifier of the peripheral device in the short distance wireless communication, the method further includes determining whether there exists, in the peripheral devices detected as a result of searching by the searching, the peripheral device having an identifier of each of the detected peripheral devices and the identifier obtained by the obtaining matching with each other, and transmitting a print job to the peripheral device determined by the determining that the identifiers match.

15. A non-transitory computer readable medium which stores a program therein for causing a computer to perform a method of searching for a peripheral device, the method comprising:

obtaining information on the peripheral device in short distance wireless communication;

first determining whether the obtained information contains a network address of the peripheral device;

second determining whether or not the obtained information contains identification information of the peripheral device in a case where the first determining determines that the obtained information does not contain the network address of the peripheral device; and searching for peripheral devices on a network and identifying, from among the peripheral devices, a peripheral device to which the same identification information as the obtained information contains has been set in a case where the second determining determines that the obtained information contains identification information and an instruction search for a peripheral device is made.

* * * * *